(12) United States Patent
Brooks

(10) Patent No.: US 7,849,038 B2
(45) Date of Patent: Dec. 7, 2010

(54) METHOD FOR USING THE SECOND HOMOTOPY GROUP IN ASSESSING THE SIMILARITY OF SETS OF DATA

(76) Inventor: Roger K. Brooks, 690 Wildwood La., Palo Alto, CA (US) 94303

( * ) Notice: Subject to any disclaimer, the term of this patent is extended or adjusted under 35 U.S.C. 154(b) by 587 days.

(21) Appl. No.: 11/941,524

(22) Filed: Nov. 16, 2007

(65) Prior Publication Data

US 2008/0162421 A1 Jul. 3, 2008

Related U.S. Application Data

(60) Provisional application No. 60/883,001, filed on Dec. 31, 2006.

(51) Int. Cl.
*G06F 17/00* (2006.01)
(52) U.S. Cl. ...................................................... 706/45
(58) Field of Classification Search ............. 706/45–46, 706/62; 707/692, 758, 749; 708/201
See application file for complete search history.

(56) References Cited

U.S. PATENT DOCUMENTS

| | | | | |
|---|---|---|---|---|
| 5,442,716 A | * | 8/1995 | Otsu et al. ................. 382/181 |
| 5,933,823 A | * | 8/1999 | Cullen et al. ........................ 1/1 |
| 7,031,980 B2 | * | 4/2006 | Logan et al. ........................ 1/1 |
| 2008/0140741 A1 | * | 6/2008 | Brooks ......................... 708/201 |
| 2008/0162422 A1 | * | 7/2008 | Brooks ........................... 707/2 |
| 2008/0215529 A1 | * | 9/2008 | Brooks ........................... 707/2 |
| 2008/0215530 A1 | * | 9/2008 | Brooks ........................... 707/2 |
| 2008/0215566 A1 | * | 9/2008 | Brooks ........................... 707/5 |
| 2008/0215567 A1 | * | 9/2008 | Brooks ........................... 707/5 |

* cited by examiner

*Primary Examiner*—David R Vincent

(57) ABSTRACT

A method for finding sets of two-dimensional data (S2DDs), which are similar to a target S2DD, is invented. The method leverages a new category of signatures, called equivalence signatures, to characterize the S2DDs. These signatures have the salient feature that, at worst, they change in a bounded manner when changes are made to the S2DD and when used to find S2DDs that are similar to a target S2DDs, they allow for a significant reduction in the number of SDDs to be compared with the target. This is an improvement over the state of the art wherein the computational expensive process of performing a complete search against the entire corpus must be applied.

18 Claims, 4 Drawing Sheets

METHOD FOR USING THE SECOND HOMOTOPY GROUP IN ASSESSING THE SIMILARITY OF SETS OF DATA

CROSS-REFERENCE TO RELATED APPLICATIONS

This application claims the benefit of PPA Ser. No. 60/883,001, filed Dec. 31, 2006 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to the identification and retrieval of digital data by a computing device.

2. Prior Art

A method for the discovery of digital data, such as images, that are organized for point-wise two dimensional presentation (2DDDs), that are similar to a target 2DDD is invented here. Formulae from algebraic topology [Spanier] are used to compute signatures that characterize equivalence classes of 2DDDs. The method leverages these "equivalence signatures" to find 2DDDs that are similar to target 2DDDs and, separately and alternatively, find 2DDDs that are dissimilar from the target 2DDDs. The most important examples of 2DDD are images, video frames and rasterized graphics data. In this invention, we will refer to such 2DDD simply as images.

The definition of "similarity", and thus the features and method used to compute it, is idiosyncratic to the retrieval application [O'Connor]. In the case of image retrieval [Gonzalez], methods using entropy, moments, etc. as signatures, have been invented [5,933,823; 5,442,716]. Work in computer graphics has advanced these analytical methods by using an elementary result from topology, the Euler number of polyhedra, as a descriptor of boundary polygons of graphics objects [Foley]. Recently, a method for computing the Euler numbers of binary images using a chip design has been invented [7,027,649]. Another invention [7,246,314], uses closeness to a Gaussian model as a similarity measure for identifying similar videos.

The cost of implementing these methods is typically proportional to the product of the number of 2DDDs in the database with the cost of computing the distance between the target 2DDD and another 2DDD. The latter often [Raghavan] involves the computation of the projection angle between two vectors that represent the features (e.g., histogram of the text elements) of the 2DDDs. For large databases, this process can be both resource and time expensive. A two step method is required wherein, during the retrieval phase, the number of candidates for similarity is significantly reduced in a computationally inexpensive first step and then the traditional features can be applied to the reduced set of candidates.

Intuitively, if two 2DDDs are similar, then they should be deformable into each other without having to remove or glue together portions of 2DDDs. For example, if two images are rescalings and/or rotations of each other, then the images are similar. The field of topology provides a foundation for solving this problem. In particular, we appeal to homotopy invariants that characterize equivalence classes of maps between topological spaces [Bott].

We interpret each 2DDD as a sampling of maps from a two-dimensional presentation space to a n-dimensional topological space and seek homotopy equivalence classes of such maps. Mapping of the Cartesian subspace onto the two-dimensional sphere can be done by a number of methods. Here, we will ascribe the azimuthal and zenith angles $(\theta^1, \theta^2)$ of the sphere, $S^2$, as the horizontal and vertical coordinates, $(x^1, x^2)$, on the image, or vice versa:

$$\theta^i \equiv \frac{2\pi x^i}{L^i},$$

where the $L^i$ (i=1,2) are the lengths of the respective dimensions. In another embodiment, an embedding into three dimensional Euclidean space is first performed.

We work with 2DDDs that have at least two data planes, $\tilde{\sigma}^A(\theta^1, \theta^2)$, with maximum and minimum values, $\tilde{\sigma}_{max}^A$ and $\tilde{\sigma}_{min}^A$, respectively. The maximum and minimum values of each of the two planes are used to normalize their data to new minimum and maximum values, $\sigma_{max}^A$ and $\sigma_{min}^A$ respectively, through the expressions:

$$\sigma^A(\theta^1, \theta^2) = \left[\frac{\sigma_{max}^A - \sigma_{min}^A}{\tilde{\sigma}_{max}^A - \tilde{\sigma}_{min}^A}\right][\tilde{\sigma}^A(\theta^1, \theta^2) - \tilde{\sigma}_{max}^A] + \sigma_{max}^A \quad \text{Eqn. 1}$$

Additional normalizations of the 2DDD, such as scaling to a fixed width and height and the like, may also be performed.

To leverage the equivalence classes of the Second Homotopy Group [Bott], $\pi_2(S^2)=Z$, we select pairs of the normalized planes of the 2DDD and interpret them as the maps from the world sphere onto the target sphere:

$$\sigma: S^2 \to S^2$$

$$(\theta^1, \theta^2) \to (\sigma^1(\theta^1, \theta^2), \sigma^2(\theta^1, \theta^2)) \quad \text{Eqn. 2}$$

An example of such a choice is the two planes of chroma pixel data in a YCC color space representation of images. If objects have been segmented from the 2DDD then the data for these objects are themselves 2DDDs. We refer to each segmented portion of each pair of normalized planes henceforth as a "2DDD section" with its own map, $\sigma$. With the definition that two 2DDDs are similar if one can be continuously deformed into the other, the well-established results on equivalence classes of homotopic maps lead to the conclusions: If two 2DDD sections do not have the same value of $\pi_2(S^2)$, then they are not similar. If none of the 2DDD sections from parent 2DDDs are similar to each other, then those parent 2DDDs are not similar to each other.

The equivalence signature, $\xi[\sigma]$, of a 2DDD section is given by the value of $\pi_2(S^2)$ for the section computed as [Schwarz]

$$\xi[\sigma] \equiv \pi_2[\sigma] = -\frac{1}{4\pi}\int d^2\theta \sin\sigma^2\left[\frac{\partial\sigma^1}{\partial\theta^1}\frac{\partial\sigma^2}{\partial\theta^2} - \frac{\partial\sigma^1}{\partial\theta^2}\frac{\partial\sigma^2}{\partial\theta^1}\right] \quad \text{Eqn. 3}$$

Consider two 2DDD sections, $\sigma$ and $\sigma'$ such that, at each point, the difference between the values of the maps is infinitesimal:

$$\sigma'^A(\theta^1,\theta^2)-\sigma^A(\theta^1,\theta^2)=\epsilon^A(\theta^1,\theta^2)$$

An example of such a difference is the constant rescaling and shifts of the data values at each point $$\sigma'^A(\theta^1,\theta^2)-\sigma^A(\theta^1,\theta^2)=\alpha^A\sigma^A(\theta^1,\theta^2)+\beta^A \qquad \text{Eqn. 5}$$

for some fixed, small, real constants $\alpha^A$ and $\beta^A$. The difference in the values of the equivalence signatures for the two 2DDD sections, in term of the first one, σ, is $$\Delta\xi[\sigma;\epsilon]=\xi[\sigma+\epsilon]-\xi[\sigma] \qquad \text{Eqn. 6}$$

Given a choice for the functions $\epsilon^A$, a limit on the difference of the values of the equivalence signatures for two 2DDD sections can be set so that the 2DDD sections are still regarded as similar. For example, suppose we are interested in finding images whose color planes differ by no more than p percent at each pixel, then that values $\alpha^A=p$ and $\beta^A=0$ are used in the computation of $\Delta\xi[\sigma;\epsilon]$. Retrieval of similarity candidates then proceeds by finding those images with values of $\xi[\sigma]$, denoted as $\xi[\sigma_{similar}]$, for which the following inequalities hold:

$$|\xi[\sigma_{target}]-\xi[\sigma_{similar}]|\leq|\Delta\xi[\sigma_{target};\epsilon]| \qquad \text{Eqn. 7}$$

As an example for the reduction factor for the number of CPU cycles and other resources required to find similar sections of 2DDDs in a corpus, assume for simplicity that and that the equivalences signatures of the 2DDDs in the corpus are uniformly distributed in $[\xi_{max},\xi_{min}]$. If for a target 2DDD section, the choice of $\epsilon^A$ leads to a value for $\Delta\xi[\sigma;\epsilon]$, the reduction in the number of secondary features to be compared is $$f_r = \frac{(2|\Delta\xi[\sigma;\epsilon]|+1)}{(\xi_{max}-\xi_{min}+1)} \qquad \text{Eqn. 8}$$

In state of the art information retrieval methodologies, the feature vector which is used for each 2DDD would have to be compared to all NA feature vectors computed for the 2DDDs in the corpus. Upon employing the method invented here as a precursor to the feature vector comparison, the number of feature vectors to be compared would be reduced to $f_r N_c$.

OBJECTS AND ADVANTAGES

The objects of the current invention include the:
1. computation of an equivalence signature for each 2DDD section such that 22DDD sections that do not have the same equivalence signatures will not be similar,
2. population of a database with the equivalence signatures, secondary features and other meta data about the 2DDD,
3. use of the equivalence signatures for the identification of those 2DDDs that are not similar to a target 2DDD,
4. use of equivalence signatures for the identification of those candidate 2DDDs that may be similar to a target 2DDD,
5. use of the secondary features and other meta data for the candidate similar 2DDDs in further analysis, such as feature comparison, to determine the final set of similar 2DDDs, and
6. retrieval of the files containing the similar 2DDDs by means of the meta data stored in the database.

The advantages of the current invention include:
1. a method for computing these signatures for data, such as images and video frames, that have segmented components realized in a two-dimensional plane with each point in the plane having a plurality of values,
2. a quantifiable means for measuring similarity, and
3. the computational and resource expense of using feature comparison methods to determine the similarity of 2DDDs is reduced to a fraction given by a function of the percentage change allowed between similar data.

SUMMARY

In accordance with the present invention, a method for determining the similarity of sets of data uses the Second Homotopy Group to compute an equivalence signature for each segmented component or section of two-dimensional digital data (2DDD), and further uses the differences of the equivalence signatures of any two sections of 2DDD as the measure of the similarity distance between said 2DDD sections. The output from this method can be used to significantly reduce the computational expense, time and resources required by a subsequent secondary feature comparison.

DRAWINGS

Figures

In the drawings, closely related figures have the same numerically close numbers.

DETAILED DESCRIPTION

Preferred Embodiment

FIGS. 1-4

A preferred embodiment of the method of the present invention is illustrated in FIGS. 1-4.

A 2DDD is represented as a set of integers (realized in a computing device as a set number of bits). Each 2DDD may be realized as the addition of layers of 2DDD sections. The entire 2DDD, or the resultant from the point-wise addition of all the layers of the 2DDD, is also taken to be a section. Each two-dimensional point in said sections may have a plurality of integer values. For example, some images are composed of a set of layers of segmented objects with each pixel having three color values or one luminance and two color values.

To determine the similarity, or separately and alternatively non-similarity, of one or a plurality of 2DDDs with a plurality of 2DDDs, each 2DDD may be numerically characterized. For example, each section of the 2DDDs of a corpus of 2DDDs may be assigned an equivalence signature that has the property that small changes to the section of the 2DDD, which maintain similarity with the original section of the 2DDD, will not significantly change the equivalence signature.

As specified by Eqn. 3, the equivalence signature for each section of a 2DDD is given by the functional representation of the Second Homotopy Group computed over the data of the 2DDD's section interpreted as a mapping between two, two dimensional spheres. Once an equivalence signature is assigned to a section of a 2DDD, then a plurality of 2DDDs that are deformations of the former 2DDD will have equivalence signatures that are within a bounded range of the equivalence signature of the former 2DDD as given by Eqn. 7. That range is computed based on configurable similarity threshold parameters that specify the maximum shift and ratio of the values of the data at a point in two similar sections of 2DDDs. Consequently, 2DDD sections that are candidates for similarity with a section of a target 2DDD can be identified, in a database, by requiring that the absolute value of the difference between the values of their equivalence signatures and that of the target's section be no more than the maximum allowed difference computed in terms of the target's data and the similarity threshold parameters. If a target 2DDD has $N_S^{(T)}$ sections of which $N_S^{(T)}(X)$ are similar to the sections of another 2DDD, X, then the degree of similarity of X to the target 2DDD is $$\frac{N_s^{(T)}(X)}{N_s^{(T)}}.$$

The closer the degree of similarity to one, the more similar X is to the target 2DDD. 2DDDs in a database that are not similar to a target 2DDD will have a similarity degree of zero.

Operation—Preferred Embodiment—FIGS. 1-4

Figure 1:
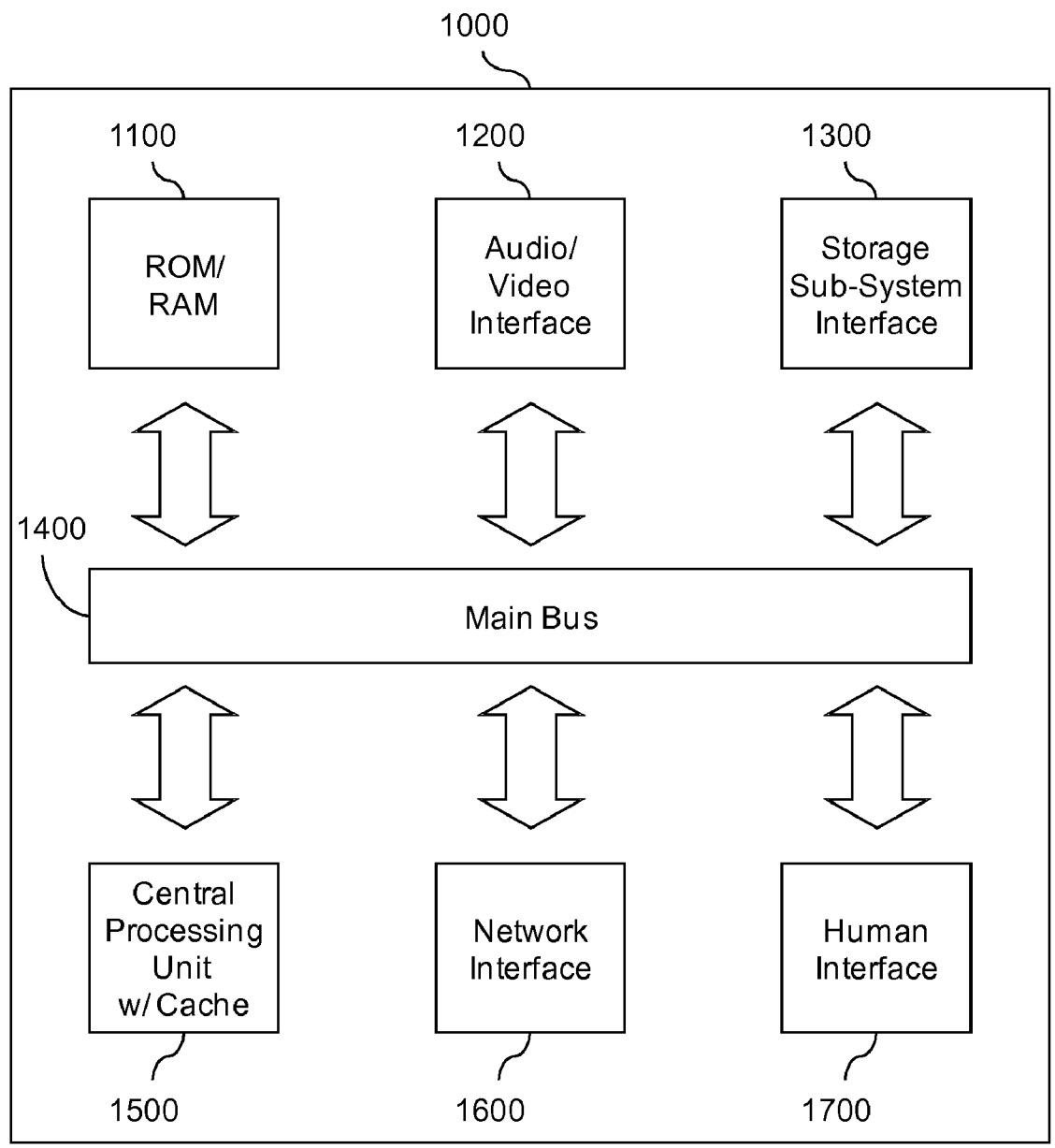
FIG. 1 is a block diagram of a computing device for calculating the equivalence signatures of a plurality of 2DDDs (targets) and finding previously analyzed 2DDDs that are similar to (or separately and alternatively not similar to) the target(s), according to one embodiment.

In FIG. 1, an illustration of a typical computing device 1000 is configured according to the preferred embodiment of the present invention. This diagram is just an example, which should not unduly limit the scope of the claims of this invention. Anyone skilled in the art could recognize many other variations, modifications, and alternatives. Computing device 1000 typically consists of a number of components including Main Memory 1100, zero or more external audio and/or video interfaces 1200, one or more interfaces 1300 to one or more storage devices, a bus 1400, a processing unit 1500, one or more network interfaces 1600, a human interface subsystem 1700 enabling a human operator to interact with the computing device, and the like.

The Main Memory 1100 typically consists of random access memory (RAM) embodied as integrated circuit chips and is used for temporarily storing the 2DDDs, configuration data, database records and intermediate and final results processed and produced by the instructions implementing the method invented here as well as the instructions implementing the method, the operating system and the functions of other components in the computing device 1000.

Zero or more external audio and/or video interfaces 1200 convert digital and/or analog A/V signals from external A/V sources into digital formats that can be reduced to PCM/YUV values and the like. Video frames of YUV values at each two-dimensional point in the frame are 2DDDs.

Storage sub-system interface 1300 manages the exchange of data between the computing device 1000 and one or more internal and/or one or more external storage devices such as hard drives which function as tangible media for storage of the data processed by the instructions embodying the method of this invention as well as the computer program files containing those instructions, and the instructions of other computer programs directly or indirectly executed by the instructions, embodying the method of this invention.

The bus 1400 embodies a channel over which data is communicated between the components of the computing device 1000.

The processing unit 1500 is typically one or more chips such as a CPU or ASICs, that execute instructions including those instructions embodying the method of this invention.

The network interface 1600 typically consists of one or more wired or wireless hardware devices and software drivers such as NIC cards, 802.11x cards, Bluetooth interfaces and the like, for communication over a network to other computing devices.

The human interface subsystem 1700 typically consists of a graphical input device, a monitor and a keyboard allowing the user to select files that contain 2DDDs that are to be analyzed by the method.

Figure 2:
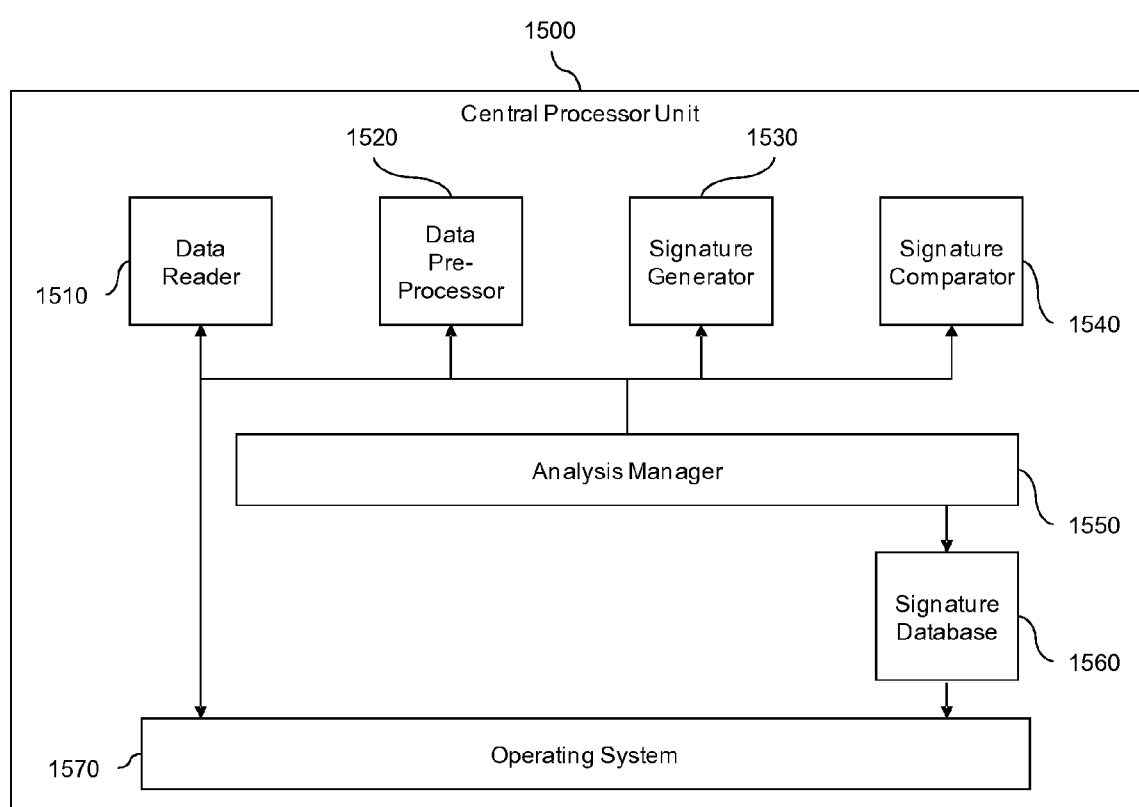
FIG. 2 is a block diagram of the modules and their interconnections, executed by the processing unit of the computing device in FIG. 1, in computing the equivalence signature of and determining the similarity of a plurality of 2DDDs to other 2DDDs, according to one embodiment.

In FIG. 2, an illustration is given of the modules executing the method of the present invention on the processing unit 1500.

An equivalence signature is computed as in, 1500, for a 2DDD under the control of the Analysis Manager. First, the Analysis Manager 1550 instructs the Data Reader 1510 to read the 2DDD and return control to the Analysis Manager 1550 upon completion. Secondly, when control is returned by the Data Reader 1510, the Analysis Manager 1550 instructs the Data Preprocessor 1520 to process the output from the Data Reader 1510 and return control to the Analysis Manager 1550 upon completion. Third, when control is returned by the Data Preprocessor 1520, the Analysis Manager 1550 instructs the Signature Generator 1530 to process the output from the Data Preprocessor 1520 and return control to the Analysis Manager 1550 upon completion. Fourth, when control is returned by the Signature Generator 1530, the Analysis Manager instructs the Signature Database 1560 to record the output from the Signature Generator 1530, said Signature Database may write the output to a file by means of calls to the Operating System 1570, and return control to the Analysis Manager 1550 upon completion. The Analysis Manager 1550 then waits for the next request.

The Data Reader module 1510 reads the 2DDD from its storage medium such as a file on a hard drive interfaced to the bus of the computing device or from a networked storage device or server using TCP/IP or UDP/IP based protocols, and the like.

The Data Preprocessor module 1520 finds the start and end of each section in the 2DDD by finding the start layer markers in the data stream of the 2DDD.

Figure 3:
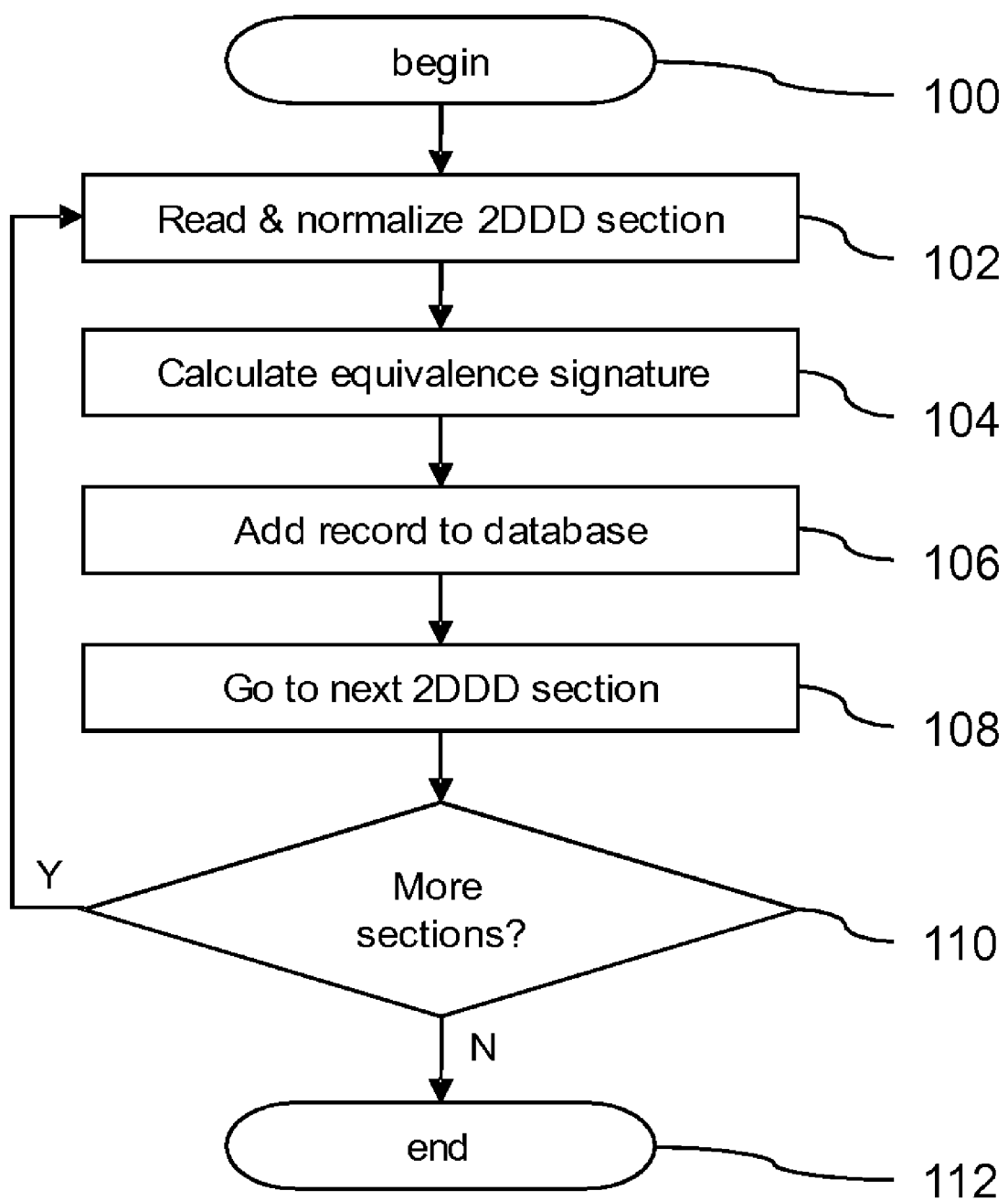
FIG. 3 is a flow diagram illustrating the steps taken by the modules, in FIG. 2, to compute equivalence signatures of 2DDDs and adding them to a database, according to one embodiment.

In FIG. 3, a request to compute the equivalence signatures of a 2DDD is received 100 by the Signature Generator 1530 which then reads the configured maximum and minimum values to which to normalize the data in subsequent steps. Secondly, it pre-processes 102 the first section from the 2DDD by executing the following steps in sequence:

1) first, allocates a section buffer in main memory and partitions it into planes that are offset from each other by the product of the width and height of each plane,
2) second, breaks each section into color planes where each world-point of the data of the section is in one-to-one correspondence with the world-point in each plane,
3) third if there are $N_p$ color planes in the section then for each of the $$\binom{N_p}{2}$$

pairs of color planes, allocating buffers for two new color planes and populating these buffers as follows,
  a) looping over the values of y from y=0 to y=(H−1) incrementing by one at each roll of the loop, where H is the height of the two-dimensional data, and for each y, looping over the values of x from x=0 to x=(W−1) incrementing by one at each roll of the loop, where W is the width of the two-dimensional data,
  b) at each roll of the latter x loop,
    i) adding the values of the data in the first and second planes and then diving the sum by the square root of two and assign the quotient as the value of the data at the point (x,y)y in the new second plane,
    ii) subtracting the value of the data in the second plane from the value of the data in the first plane and then diving the difference by the square root of two and assign the quotient as the value of the data at the point (x,y)y in the new first plane,
  c) processing then processed with these new color planes,
4) fourth, for each color plane, sets the maximum value and minimum value to the value of the data at the first point in the plane and then sequentially reads the value of the data at each subsequent point in the plane to see if that value is
  a) larger than the current maximum value for the plane, in which case it updates the current maximum value for the plane to the value of the data at the current point, or
  b) smaller than the current minimum value for the plane, in which case it updates the current minimum value for the plane to the value of the data at the current point,
5) fifth, for each color plane, normalizes each data value read by
  a) subtracting the configured maximum value for the plane from said data value,
  b) multiplying the result from by the ratio of the differences between the configured maximum and minimum values for the plane and the difference between the maximum and minimum values computed for the plane in step, and
  c) adding the maximum value to form the normalized value,
  d) said normalized value is then written to the section buffer,
6) sixth 104, if there are $N_p$ color planes in the section then for each of the $$\binom{N_p}{2}$$

pairs of color planes, the equivalence signature is calculated as follows:
  a) introducing and setting a variable, ES, to zero,
  b) processing loops over the values of y from y=0 to y=(H−1) incrementing by one at each roll of the loop, where H is the height of the two-dimensional data,
  c) for each y, loops over the values of x from x=0 to x=(W−1) incrementing by one at each roll of the loop, where W is the width of the two-dimensional data,
  d) for each x and y,
    i) reading the data values at (x,y), (x+1,y), (x,y+1) and (x+1,y+1) from the first plane and assigning it as the values of the variables with names such as $\sigma_{x,y}^1$, $\sigma_{x+1,y}^1$, $\sigma_{x,y+1}^1$, $\sigma_{x+1,y+1}^1$, respectively,
    ii) reading the data values at (x,y), (x+1,y), (x,y+1) and (x+1,y+1) from the second plane and assigning it as the values of the variables with names such as $\sigma_{x,y}^2$, $\sigma_{x+1,y}^2$, $\sigma_{x,y+1}^2$, $\sigma_{x+1,y+1}^2$, respectively,
    iii) computing the difference of $\sigma_{x+1,y}^1$ minus $\sigma_{x,y}^1$ and assigning the result to a variable with name such as $d_x\sigma_{x,y}^1$,
    iv) computing the difference of $\sigma_{x,y+1}^1$ minus $\sigma_{x,y}^1$ and assigning the result to a variable with name such as $d_y\sigma_{x,y}^1$,
    v) computing the difference of $\sigma_{x+1,y}^2$ minus $\sigma_{x,y}^2$ and assigning the result to a variable with name such as $d_x\sigma_{x,y}^2$,
    vi) computing the difference of $\sigma_{x,y+1}^2$ minus $\sigma_{x,y}^2$ and assigning the result to a variable with name such as $d_y\sigma_{x,y}^2$,
    vii) computing the product of the sin $\sigma_{x,y}^2$ and the difference of
      (1) the products of the values of the variables $d_y\sigma_{x,y}^1$ and $d_x\sigma_{x,y}^2$,
      (2) the products of the values of the variables $d_x\sigma_{x,y}^1$ and $d_y\sigma_{x,y}^2$ and
  e) adding the result from the latter step to the value of the variables ES and setting the value of ES to the sum,
7) seventh, upon completion of both loops, dividing the value of ES by the product of four times the value of $\pi$ and setting the value of ES to the result,
8) eighth 106, a new record is added to the Signature Database 1560
  a) with the most significant half (MSH) of the key equal to the value the variable ES, and the least significant half (LSH) of the key set to one plus the value of the largest LSH of the other keys in the database which have a MSH equal to value of ES, and
  b) other fields containing the meta data about the section of the 2DDD that was provided in the request at 100; such meta data may include other signatures or features of the section of the 2DDD, and the like.

The calculations of 102-108 are performed while looping over the remaining sections. When no more sections remain 110, a new record is added to the Signature Database 1560 with fields containing the keys of the record of each section of the 2DDD, as added in the latter step, the meta data about the 2DDD including the path or URL to the file containing the 2DDD, the data and time that the 2DDD was last written, a text description of the data in the 2DDD, the name of the source or author for the 2DDD, the policy for the use of the 2DDD, other signatures or features of the 2DDD, and the like.

Figure 4:
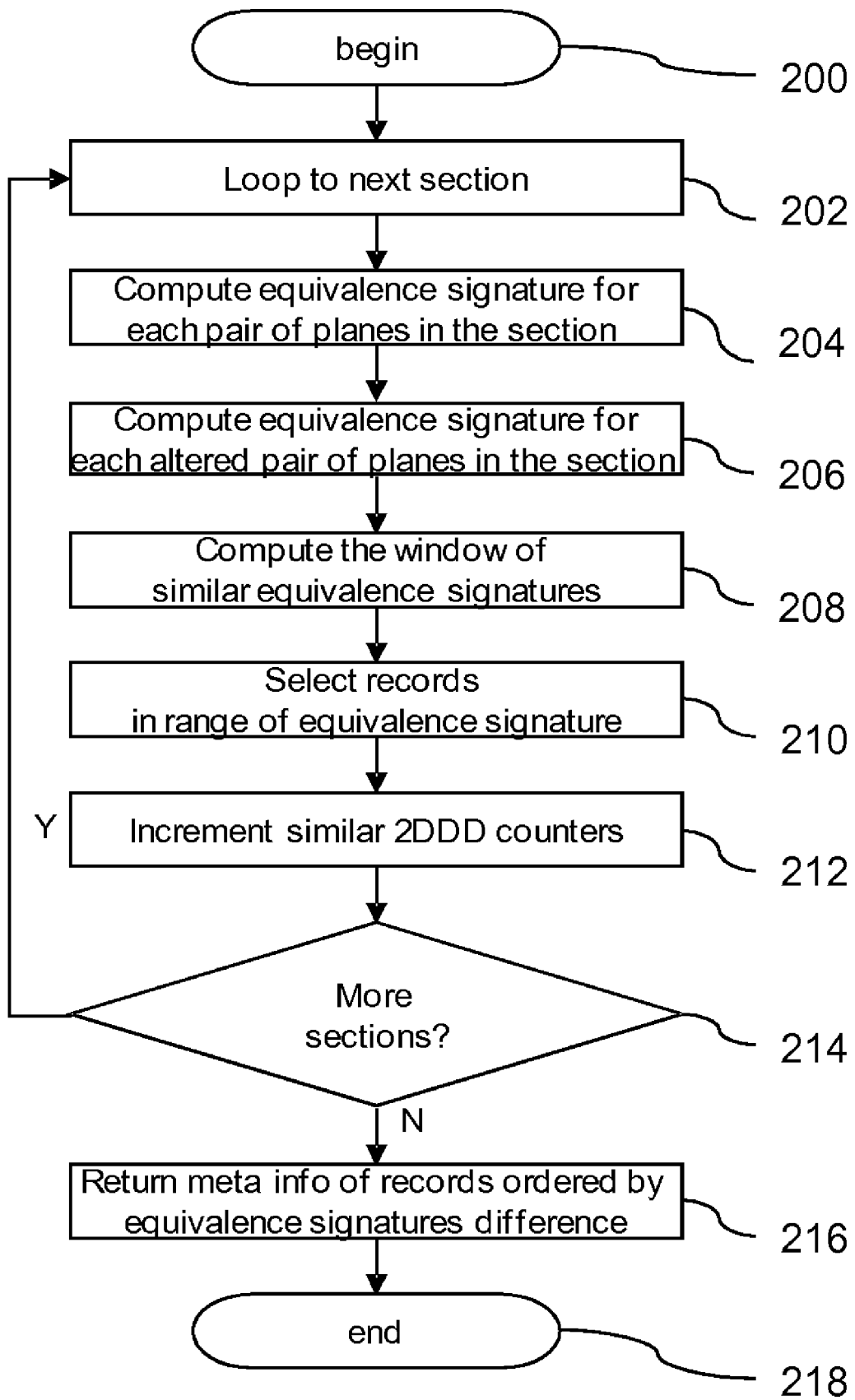
FIG. 4 is a flow diagram illustrating the steps taken by the modules, in FIG. 2, to find other 2DDDs that are similar to a target 2DDD, according to one embodiment.

In FIG. 4, a target 2DDD is provided in a request 200 to the Analysis Manager 1550 to find 2DDDs, that were previously analyzed and whose equivalence signatures are stored in records of the Signature Database 1560 that are candidates for similarity with the target. To with, the Analysis Manager 1550 instructs the Data Reader 1510, Data Preprocessor 1520 and Signature Generator 1530 in series as follows:
1) a dictionary, the dictionary of candidate similar 2DDDs, ordered as the doublet (key of a 2DDD meta data record, count of appearance of similar pairs of planes with said key of a 2DDD meta data record) is initiated with all counts set to zero,
2) a loop over each section in the target 2DDD is performed 202
  a) a loop over each pair of planes in the current section in the outer loop, is performed i) the equivalence signatures for the pair of planes in the loop is computed 204 as described by FIG. 3, with each equivalence signatures so computed then stored as the value of the variable, ES,
ii) a second equivalence signature is computed 206 as described by FIG. 3 and then stored as the value of the variable, ESPrime, except that the value of the data at each point is replaced by the sum of
   (1) the similarity shift value for the plane, and
   (2) the product of
      (a) the sum of the percentage scale factor for that plane and one, and
      (b) the value of the data at the point,
iii) the minimum equivalence signature for a similar pair of planes is computed 208 as the minimum of
   (1) ESPrime, and
   (2) twice the value of the variable ES minus the value of ESPrime,
   and the value of said minimum equivalence signature is assigned to the variable ESMin,
iv) the maximum equivalence signature for a similar pair of planes is computed 208 as the maximum of
   (1) ESPrime, and
   (2) twice the value of the variable ES minus the value of ESPrime,
   and the value of said maximum equivalence signature is assigned to the variable ESMax,
v) a loop is performed over the signature records in the Signature Database 1560 for which the MSH of keys of the records is equal to or greater than the ESMin and less than or equal to ESMax, from each of the signature records found, the key for the meta data record of the 2DDD associated with the signature record is extracted and the count of the corresponding entry in the dictionary of candidate similar 2DDDs is incremented,
vi) processing passes to the next pair of planes in the current section
b) processing passes to the next section in the target 2DDD
3) the keys of the 2DDD meta data records appearing in the dictionary of candidate similar 2DDDs are ordered by their appearance counts from highest count to lowest,
4) the meta data from each field in each record whose key is in the dictionary of candidate similar 2DDDs is returned, by the Analysis Manager 1550, ordered from most similar to less similar according to the ordering in step.

Operation—Additional Embodiments—FIG. 2

In a second embodiment, an equivalence signature is computed for a 2DDD as in 1500 through the pipelined steps: Data Reader 1510→Data Preprocessor 1520→Signature Generator 1530→Signature Database 1560 with the Data Reader 1510, Data Preprocessor 1520, Signature Generator 1530, and Signature Database 1560 performing the same function as in the preferred embodiment except that each module calls the succeeded module in the pipeline upon completion of their computation. In this second embodiment, the Analysis Manager is not invoked.

CONCLUSION, RAMIFICATIONS, AND SCOPE

Accordingly, the reader will see that the method invented here introduces novel features of an equivalence signature including that
1. it is computationally inexpensive to compute;
2. it can be directly used to reduce by a factor, the set of candidate 2DDDs that are to be further analyzed for similarity by more computationally intensive feature comparison techniques such as [7,031,980; 5,933,823; 5,442,716] and a similar reduction in the computing cycles and resources needed to find 2DDDs can be obtained;
3. the difference between the equivalence signatures of two non-homotopically equivalent 2DDDs is bounded;
4. 2DDDs with subsequences in the same homotopy classes will have the same value for the equivalence signature;
5. it is an integer by virtue of the fact [Bott] that $\pi_2(S^2)=Z$.

The present invention has been described by a limited number of embodiments. However, anyone skilled in the art will recognize numerous modifications of the embodiments. It is the intention that the following claims include all modifications that fall within the spirit and scope of the present invention.

What is claimed is:
1. A computer method for using the Second Homotopy Group to assess the similarity of sets of two dimensional digital data (S2DDD) comprising:
   a) receiving, into a memory by a processor, one or more sets of digital data for presentation in two-dimensions each S2DDD comprising:
      i) at least two data values per data point organized in sequential addresses or at set intervals of addresses,
      ii) the number of data values per data point,
      iii) a specified starting address,
      iv) a specified number of data points, called the width, in the horizontal or x-direction, and
      v) a specified number of data points, called the height, in the vertical or y-direction,
   b) computing a numerical similarity signature for the received S2DDD, referred to as the equivalence signature, as the Second Homotopy Group's invariant for the values of said S2DDD interpreted as a map from the two-dimensional presentation space into the space of the S2DDD,
   c) querying a database for similarity signature that is equivalent to the computer similarity signature of the received S2DDD,
   d) computing a similarity distance between the computed similarity signature of the received S2DDD and any S2DDD in said database as the absolute value of the difference of their equivalence signatures, and
   e) outputting results of the query, and
      wherein computing an equivalence signature as the Second Homotopy Group's invariant of a pair of planes of normalized digital data further comprises:
   looping over each y-position, from the first x-position to the second to last y-position, and over each x-position, from the first x-position to the second to last x-position, and for each position,
   a) computing the difference of the data value at said position in the first plane and the data value at said position shifted by one in the x-direction in the first plane,
   b) repeating the step a but with the first plane replaced by the second plane and the x-direction replaced by the y-direction,
   c) multiplying the results from steps a and b,
   d) repeating steps a-c but with the first plane replaced by the second plane and vice versa,
   e) computing the difference of the results from step c and step d and multiplying the result with the sine of the data value at said position in the second plane, f) adding the result from step e to the result computed in the last roll of the inner loop to form the result for the current roll of the inner loop with the value set to zero in the initial roll, and g) upon completion of both loops, diving the result from the last roll of the inner loop by negative four times the value of the constant Π to the value of the equivalence signature.

2. The method of claim 1, comprising a means for arranging the data values into planes with specified starting addresses, widths and heights wherein the $i^{th}$ plane consists of the set of the $i^{th}$ data values at each point.

3. The method of claim 1, wherein computing an equivalence signature of a pair of planes of digital data further comprises:
   a) forming two new planes as the sum and difference of the data values at each point of the original two planes divided by the square root of two,
   b) then normalizing the data values of each new plane by any of a plurality of methods including linearly mapping the data of each plane individually to fixed maximum and minimum values using slope-offset formulae and the like.

4. A method comprising:
   a) receiving, into a memory by a processor, one or more sets of digital data for presentation in two-dimensions each set comprising:
      i) at least two data values per data point organized in sequential addresses or at set intervals of addresses,
      ii) the number of data values per data point,
      iii) a specified starting address,
      iv) a specified number of data points, called the width, in the horizontal or x-direction, and
      v) a specified number of data points, called the height, in the vertical or y-direction,
   b) computing a numerical similarity signature, referred to as the equivalence signature, for the received set of two-dimensional digital data, as the Second Homotopy Group's invariant for the values of said data interpreted as a map from the two-dimensional presentation space into the space of the data,
   c) computing a similarity distance between two sets of two-dimensional digital data as the absolute value of the difference of their equivalence signatures,
   d) storing a record for each of the pairs of planes of said input set of two-dimensional digital data in a database if said record is not already present in the database, and
   e) querying the database for pairs of planes of the sets of two-dimensional digital data that are candidates for similarity with said one or more target pairs of planes of the said input set of two-dimensional digital data, and
   further comprising the selection of a target pair of planes of said input set and the computation of a lower and upper bound on the values of the equivalence signature such that any pair of planes of sets of digital data with equivalence signatures that are less than the lower bound or greater than the upper bound will not be similar to the target pair of planes and all other pairs of planes of sets of digital data recorded in the database will be candidates for pairs of planes of sets of digital data that are similar to the target pair of planes, with
      a) the lower bound given by the equivalence signature of the target pair of planes minus the absolute value of an equivalence signature delta for the target pair of planes, and
      b) the upper bound given by the equivalence signature of the target pair of planes plus the absolute value of an equivalence signature delta for the target pair of planes.

5. The method of claim 4, further comprises creating and writing a record, in said database, for each pair of planes in each set of the said input sets of two-dimensional digital data, said record comprises:
   a) a key,
      i) the most significant half of whose value, is the equivalence signature of said pair of planes in the set of two-dimensional digital data, and
      ii) the least significant half of whose value is the sequential count, starting at zero, of pairs of planes of digital data with said equivalence signature and whose equivalence signatures were previously written to the database,
   b) one or more fields including a field storing the value referencing the medium wherein said set of two-dimensional digital data is stored,
   c) one or more fields including secondary feature data, for said planes or set of two-dimensional digital data, and
   d) other fields containing meta data about said set of two-dimensional digital data.

6. The method of claim 4, wherein a storage identifier comprises the location of a file containing a set of two-dimensional digital data along with the starting position of said data set in the file and the length of the data comprising said set.

7. The method of claim 4, further comprising a means for writing a record including assigning the key, the most significant half of whose value is the equivalence signature for a pair of planes in the set of two-dimensional digital data.

8. The method of claim 4, further comprising a means for reading a plurality of records and for each of the records extracting the equivalence signature of a set of two-dimensional digital data as the most significant half of the key of the record and extracting the fields, containing secondary features as well as the meta data, including the storage identifier, from the record.

9. The method of claim 4, further comprising a means for retrieving, from said database, a plurality of records for which the most significant half of the values of the keys of the records are equal to a specified equivalence signature of a said target pairs of planes.

10. The method of claim 4, further comprising a means for retrieving from said database a plurality of records with the most significant half of the values of the keys being within a range of equivalence signatures.

11. The method of claim 4, further comprising a means of extracting, from said database, a plurality of records with keys such that the most significant half of each key is equal to or greater than said lower bound and equal to or less than said upper bound.

12. The method of claim 4, wherein said equivalence signature delta is computed as the equivalence signature of said target pair of planes of a set of digital data minus a second equivalence signature for said target pair of planes with data values rescaled and shifted by set constants for each plane specifying the maximum scaling and shifting of the data values at each data point in a plane in order for the plane so altered to still be considered similar to the corresponding unaltered plane.

13. The method of claim 12, further comprising a means for specifying the maximum scaling and shifting of the data values at each data point in a plane in order for the plane so altered to still be considered similar to the corresponding unaltered plane.

14. The method of claim 12, wherein the computation of said second equivalence signature is computed as the Second Homotopy Group's invariant of a pair of planes, with said resealing and shifting of the data values, and consisting of a means to normalize the digital data, and further comprising looping over each y-position, from the first y-position to the second to last y-position, and over each x-position, from the first x-position to the second to last x-position, and for each position,
- a) computing the difference of the data value at said position in the first plane and the data value at said position shifted by one in the x-direction in the first plane,
- b) repeating the previous step but with the first plane replaced by the second plane and the x-direction replayed by the y-direction,
- c) multiplying the results from the previous two steps,
- d) repeating the previous three steps but with the first plane replaced by the second plane and vice versa,
- e) computing the difference of the results from the previous two steps and multiplying the result with the sine of the data value at said position in the second plane
- f) adding the result from the previous step to the result computed in the last roll of the inner loop to form the result for the current roll of the inner loop with the value set to zero in the initial roll,
- g) upon completion of both loops, diving the result from the last roll of the inner loop by negative four times the value of the constant Π to form the value of the equivalence signature.

15. The method of claim 4, further comprising returning to a user of the method,
- a) the difference between the value of an equivalence signature of said target pair of planes and the most significant halves of the keys returned by said database; and
- b) the meta data from each field in the records identified by said keys.

16. The method of claim 4, further comprising calculating of and sorting of a list of differences, between the equivalence signature of said target pair of and the values of the most significant halves of the keys of the records of the candidates for similar digital data, from smallest to largest values of said differences along with a means for returning to the user of the method, the meta data from the records ordered by the sorted differences.

17. A method for querying a database for pairs of planes of sets of two-dimensional digital data that are candidates for similarity comprising:
- a) receiving, into a memory by a processor, one or more sets of digital data for presentation in two-dimensions each set comprising
  - i) at least two data values per data point organized in sequential addresses or at set intervals of addresses,
  - ii) the number of data values per data point,
  - iii) a specified starting address,
  - iv) a specified number of data points, called the width, in the horizontal or x-direction, and
  - v) a specified number of data points, called the height, in the vertical or y-direction,
- b) computing a numerical similarity signature, referred to as the equivalence signature, for a set of two-dimensional digital data, as the Second Homotopy Group's invariant for the values of said data interpreted as a map from the two-dimensional presentation space into the space of the data,
- c) computing a similarity distance between two sets of two-dimensional digital data as the absolute value of the difference of their equivalence signatures,
- d) storing a record for each of the pairs of planes of said input set of two-dimensional digital data in a database, if said record is not already present in the database, and
- e) querying the database for pairs of planes of the sets of two-dimensional digital data that are candidates for similarity with said one or more target pairs of planes of the said input set of two-dimensional digital data, and
- f) comparing a set of secondary features provided with a target pair of planes of a set of two-dimensional digital data against the secondary features for similar pairs of planes of two-dimensional digital data whose records are in said database, and wherein computing an equivalence signature as the Second Homotopy Group's invariant of a pair of planes of normalized digital data further comprises:

looping over each y-position, from the first x-position to the second to last y-position, and over each x-position, from the first x-position to the second to last x-position, and for each position,
- a) computing the difference of the data value at said position in the first plane and the data value at said position shifted by one in the x-direction in the first plane,
- b) repeating the step a but with the first plane replaced by the second plane and the x-direction replaced by the y-direction,
- c) multiplying the results from steps a and b,
- d) repeating steps a-c but with the first plane replaced by the second plane and vice versa,
- e) computing the difference of the results from steps c and step d and multiplying the result with the sine of the data value at said position in the second plane,
- f) adding the result from step e to the result computed in the last roll of the inner loop to form the result for the current roll of the inner loop with the value set to zero in the initial roll, and
- g) upon completion of both loops, diving the result from the last roll of the inner loop by negative four times the value of the constant Π to form the value of the equivalence signature.

18. The method of claim 17, further comprising the comparison, of said set of secondary features provided with said target pair of planes, against the secondary features for said similar pairs of planes of sets of two-dimensional digital data found by querying the database and returning the list produced by the comparison of the secondary features as the final list of pairs of planes of sets of two-dimensional digital data that are similar to said target pair of planes.

* * * * *